March 10, 1970 J. S. PARSONS 3,499,183
HEAVY DUTIES HINGES
Filed Sept. 29, 1967 2 Sheets-Sheet 1
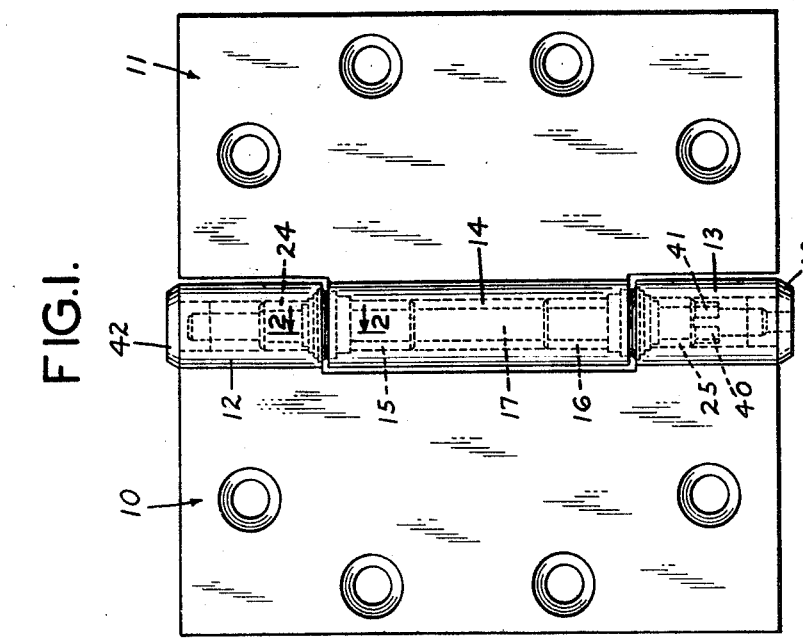
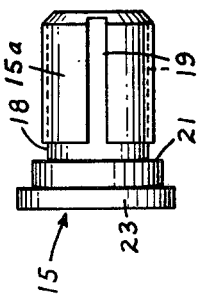
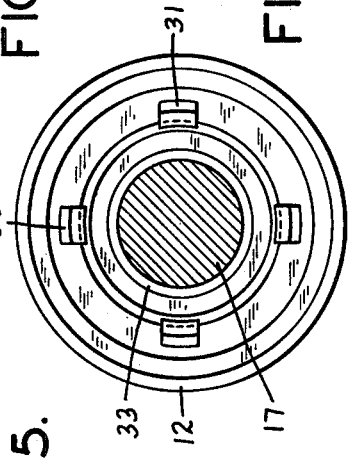
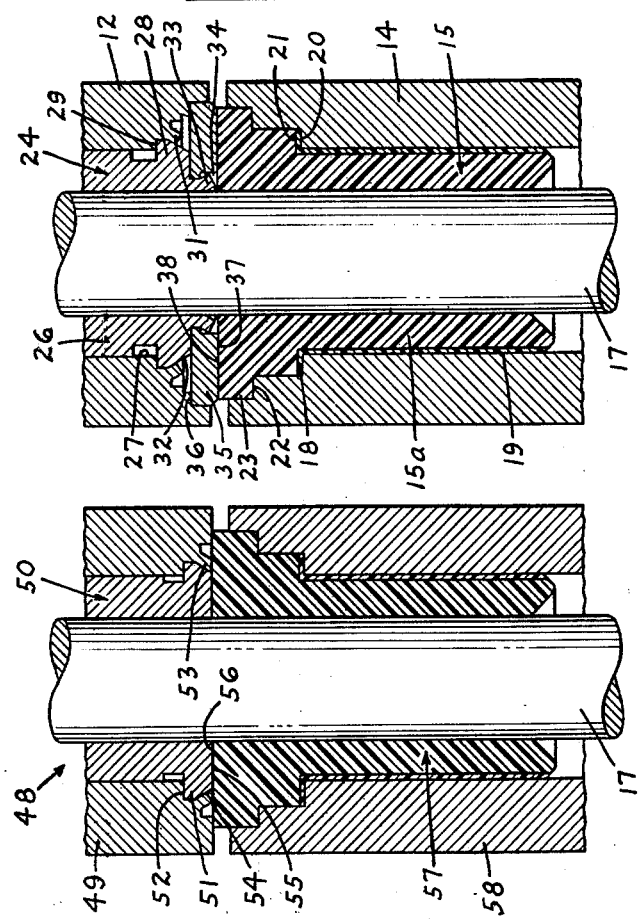
INVENTOR
JOHN S. PARSONS
BY
Brumbaugh, Free, Graves + Donohue
HIS ATTORNEYS March 10, 1970 J. S. PARSONS 3,499,183
HEAVY DUTIES HINGES
Filed Sept. 29, 1967 2 Sheets-Sheet 2
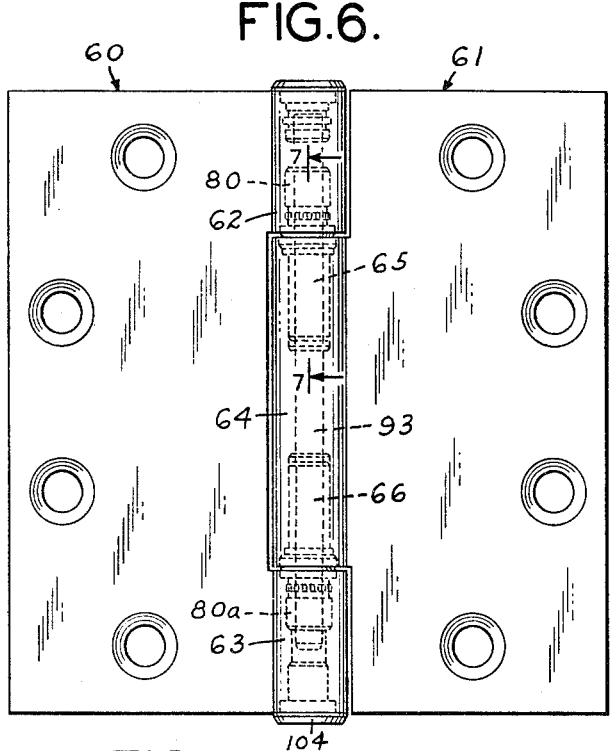
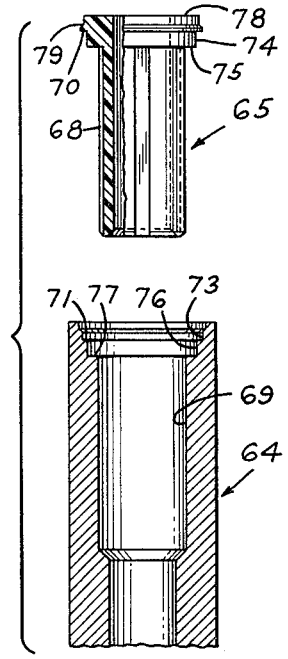
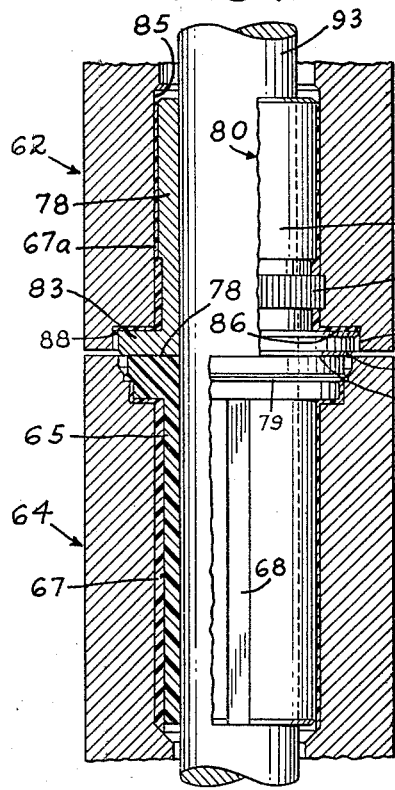
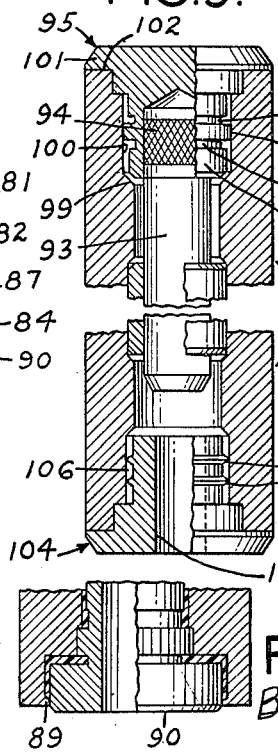
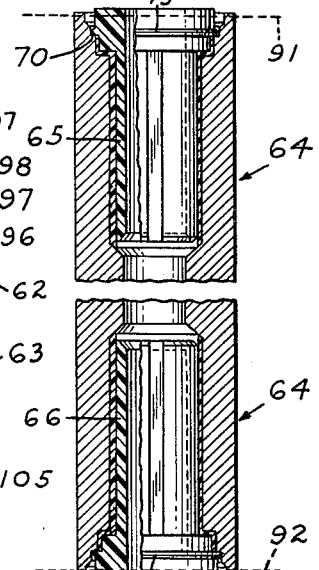
INVENTOR
JOHN S. PARSONS
BY
Brumbaugh, Free, Graves + Donohue
HIS ATTORNEYS

United States Patent Office 3,499,183
Patented Mar. 10, 1970

3,499,183
HEAVY DUTIES HINGES
John S. Parsons, West Hartford, Conn., assignor to The Stanley Works, New Britain, Conn., a corporation of Connecticut
Filed Sept. 29, 1967, Ser. No. 671,701
Int. Cl. E05d 11/04; F16c 11/00
U.S. Cl. 16—136                    21 Claims

ABSTRACT OF THE DISCLOSURE

This invention relates to heavy duty or contract hinges for hanging heavy doors and the like which are provided with low-friction plastic bushings and cooperating highly polished metallic elements which do not require lubrication and are highly resistant to wear, shock and torsion stresses.

---

This invention relates to an improvement in hinges for doors and the like, and particularly to improvements in heavy duty or contract hinges suitable for hanging heavy interior or exterior doors of building structures which are subjected to a great many cycles of opening and closing.

In recent years, the heavy duty or contract hinges used for hanging doors weighing, in many instances, one hundred pounds or more have been provided with anti-friction bearings, such as ball bearings, in order to minimize wear thereon and reduce the need for frequent lubrication. Due to space limitations, the ball bearings used in such hinges are necessarily small and have relatively thin, light-weight metal cages. If the bearings are not properly lubricated, and even if they are adequately lubricated but are in heavy service, the cages tend to wear and to break, thereby releasing the balls and causing the hinge elements to drop and become misaligned and ultimately to be damaged beyond repair.

Attempts have been made in the past to use sleeve-like bushings of stainless steel or the like in the hinge knuckles in the place of ball bearings in order to improve corrosion resistance, reduce wear, and provide a longer operating life. Such sleeve-bearing hinges, however, require frequent lubrication and moreover, they are difficult to manufacture with the degree of precision required to prevent early looseness developing in the hinge and frequent readjustment of the doors because of such hinge wear. These sleeves or stainless steel bushings are made so that they can be inserted in the hinge knuckles with a drive fit so that they will not rotate in the hinge knuckles and are not readily displaced therefrom. However, after driving the bushings into the hinge knuckles, the bushings are compressed and it becomes necessary to rebore them to enable the hinge pin or pintle to be inserted in the bushings.

The use of metallic bushings other than stainless steel bushings in the hinge knuckles has presented other problems, particularly if the hinges are to be provided with a metallic plating, such as chrome plating, for the reason that the plating solution is corrosive and upon contact with the bushings has a tendency to corrode them and thus damage the hinge during the plating operation. Such corrosion may be progressive for it is customary to plate the hinges in their assembled condition to assure the proper plating of all exposed surfaces without destroying the fit between the various components of the hinges.

For the above reasons, the presently available types of heavy duty or contract hinges have not proven entirely satisfactory in actual practice.

In accordance with the present invention, heavy duty hinges are provided which overcome the deficiencies of the prior hinges noted above in that they may be manufactured readily with close manufacturing tolerances, have a very long operating life without the need for lubrication and can withstand plating and other finishing techniques without damage thereto or without possibility of marring of the plating thereon during final assembly.

More particularly, in accordance with the present invention, hinges are provided which include knuckles on the hinge plates or leaves respectively provided with low-friction plastic bushings and cooperating highly polished and precision finished metallic elements which reduce friction to a minimum and thus minimize the need for lubrication and greatly prolong the operating life of the hinge before appreciable wear occurs.

A preferred form of the new hinge includes hinge knuckle bushings composed of anti-friction plastic, such as, for example, "Delrin," an acetal resin, having at least a surface impregnation of "Teflon," e.g., a fluorocarbon, such as, for example, polytetrafluoroethylene, the bushings being inserted into and secured in the hinge knuckles so that rotation of the bushing is prevented and without compressing the bushing and modifying its interior bore diameter. Slidably engaging the end surface of the plastic bushing is a highly polished insert member in an adjacent hinge knuckle which also serves to receive the hinge pin or pintle. The insert member is in endwise engagement with the plastic bushing over a large surface area whereby pressures are distributed and friction is minimized, and this assures easy operation of the hinge and reduces wear thereon. By embedding in the end of the knuckle the highly polished member which may be the flange of an insert bushing or a precision washer affixed to the bushing, improved concealment of the bearing elements will result and very close spacing of the knuckles is possible. By the inclusion of such permanently self-lubricating bearing elements, which do not require the addition of wet lubricants that trap dirt and dust, a sturdier and more attractive hinge is provided which is capable of operating millions of cycles without appreciable wear.

For a better understanding of the present invention, reference may be had to the accompanying drawings, in which:

FIGURE 1 is a front elevation view of a typical hinge embodying the present invention;

FIGURE 2 is a view in section taken on line 2—2 of FIGURE 1;

FIGURE 3 is an end elevational view of one of the hinge knuckles with a bushing inserted therein of a type utilized in accordance with the present invention;

FIGURE 4 is a side elevational view of an antifriction plastic bushing for an opposing hinge knuckle;

FIGURE 5 is a view in section of a modified form of hinge embodying the present invention;

FIGURE 6 is a front elevational view of a preferred form of hinge embodying the present invention;

FIGURE 7 is a view in section taken on line 7—7 of FIGURE 6;

FIGURE 8 is an exploded view of a portion of one of the hinge knuckles and a plastic bushing prior to assembly;

FIGURE 9 is a partial sectional view of the inventive hinge showing a preferred form of hinge pin;

FIGURE 10 is a view in section of one of the hinge knuckles assembled with the plastic bushings; and FIGURE 11 is a detail of the hinge knuckle and steel bushing showing a modified adhesive retainer arrangement.

Illustrative of the invention, FIGURE 1 shows a three-knuckle hinge including a pair of hinge leaves 10 and 11, the hinge leaf 10 having a pair of spaced apart knuckles 12 and 13 thereon disposed adjacent opposite ends of a knuckle 14 which is fixed to the hinge leaf 11. The hinge leaves and knuckles may be formed by any suitable type of metal, such as steel, which is capable of receiving a surface finish, such, as for example, chrome, bronze or brass plating or the like. The hinge knuckles 12, 13 and 14 are of the rolled type disposed at the inner edges of the hinge leaves 10 and 11. While a three-knuckle hinge is disclosed, the invention is not limited to a three-knuckle hinge, but may apply equally well to a two-knuckle hinge, a five-knuckle hinge or the like.

As best shown in FIGURES 1, 2 and 4, the hinge knuckle 14 has at opposite ends similar plastic bushings 15 and 16 composed of a low-friction plastic of high wear resistance, such as, for example, "Delrin," containing at least a surface impregnation of "Teflon." The bushing 15 as shown in FIGURES 2 and 4, has a cylindrical sleeve portion 15a adapted to receive a hinge pin or pintle 17 snugly and has a circumferential groove 18 and one or more longitudinally extending grooves 19 in its outer surface. The sleeve or bushing 15 can be preformed by molding or machining to precise inside and outside dimensions so that it fits in the knuckle 14 with a slide fit and receives the hinge pin 17 snugly and with a slide fit. In this way, after the bushing 15 has been inserted in a knuckle, it does not need to be rebored to receive the hinge pin.

More particularly, the bushings 15 and 16 are inserted in the hinge knuckle and secured therein by means of a suitable adhesive, such as, for example, an epoxy adhesive of the epichlorohydrin-bisphenol A type, a two component polyester resin adhesive or the like. To that end, the grooves 18 and 19 are provided so that the adhesive will be forced along the hinge knuckle toward its mid portion as the bushings 15 and 16 are inserted, thereby preventing the adhesive from contaminating the outer surface of the hinge knuckle and interfering with subsequent plating or finishing operations. Adhesive in the grooves 19 also prevents rotation of the bushing relative to the knuckle. The groove 18 forms an interlock between the bushing and the hinge knuckle at the zone of adjacent shoulders 20 and 21, formed respectively, in the hingle knuckle and the outer surface of the bushing. In addition, the hinge knuckle is provided with a shoulder 22 against which peripherally extending flange 23 at the outer end of the bushing seats in order to position the bushing accurately in the hinge knuckle with the surface of the flange 23 in a plane perpendicular to the axis of the hinge pin.

Mounted in the knuckles 12 and 13 are a pair of sleeves 24 and 25, preferably formed of a work hardenable stainless steel although they may be formed of less expensive and less corrosion resistant metal when corrosion is not a problem. The bushing 24, as best shown in FIGURE 2, includes a cylindrical sleeve portion 26 which is received in the bore 27 in the hinge knuckle 12 with a sliding fit so as to avoid compression of the bushing and the need for reboring it to fit the hinge pin 17. At the inner end of the bushing 24 is a flange 28 which is adapted to reset against a shoulder 29 extending circumferentially around the bore 27. The bushing 24 is secured in position by means of a series of tongues or claws 30, 31, etc., extending inwardly and staked over the beveled or inclined edge 32 of the flange 28 to lock the bushing in the knuckle 12. At the inner end of the bushing is an annular collar 33 which extends through a center opening 34 in a stainless steel washer 35 resting against and position by means of an annular shoulder 36 in the end of the hinge knuckle 12 or 13. With the washer 35 resting against the shoulder 36, the annular collar 33 is staked and flared out to thereby lock the washer 35 securely in the end of the hinge knuckle.

In order to minimize friction between the washer 35 which has its end face 37 in sliding engagement with the end face 38 of the plastic bushing 15, the washer is preferably precision polished to a surface smoothness on the order of from 4 to 12 microinches. The washers can be given the surface finish before they are mounted in the ends of the knuckles 12 and 13. The bushings 24 and 25, which are generally similar, center the hinge pin 17 accurately and support it against bending stresses. Resistance to bending stresses is further improved by the radial support afforded to the pin 17 by the bushings 15 and 16. Thus the bushings 15 and 16 function as low friction bearings supporting both axial and radial stresses. Note also that the clearances between the hinge knuckles 12, 13 and 14 are effectively reduced by recessing the bushings 15, 16 and 24, 25 within the hinge knuckles to leave a minimum clearance between adjacent or opposing hinge knuckles.

In plating operations, to avoid plating the polished surface of the bearing washer 35, it may be staked to the bushing 24 after the hinge elements have been plated. It will be understood that after plating, the hinge elements are treated to remove the plating solution and are dried to avoid progressive corrosion. The plastic bushings 15 and 16 are corrosion-resistant and being non-conductive may be inserted in the knuckle 14 before plating.

Inasmuch as the various bushings and the hinge pins can be machined to close tolerances prior to inserting them into the hinge knuckles, and these components are not deformed by the inserting, cementing, plating and staking operations, further machining or treatment is reduced to a minimum.

It will be understood that the bushing 25 may be provided with a hinge pin retainer, such as, for example, arcuate flanges 40 and 41 (FIGURE 1) at its outer end which may be staked or bent inwardly slightly to engage the hinge pin and restrain it against movement with respect to the hinge knuckles 12 and 13. These retainer flanges 40 and 41 may be integral with the bushing 24. Also, the pin 17 and the hinge knuckle 13 may be provided with pin tips 42 and 43 to protect and to enhance the appearance of the hinges.

Hinges of the type described above have been operated millions of cycles without noticeable wear or developing objectionable looseness, with doors weighing 200 pounds and with two three-knuckle hinges of the type described spaced apart five feet along the edge of the door.

The hinges are susceptible to modification and, as shown in FIGURE 5, the metallic bushings in the hinge 48 may be modified. Thus, in a knuckle 49, a bushing 50 is formed of steel bar stock of smaller diameter than the diameter of the hinge knuckle and provided with a flange 51 at one end. The flange 51 seats against a shoulder 52 in the hinge knuckle 49 and is retained therein by means of swaged tongues or claws 53 which engage the beveled or tapered edge 54 of the flange. The wide face 55 of the flange 51 is flush or substantially so with the end of the hinge knuckle and bears against the end face 56 of the anti-friction plastic bushing 57 received in the hinge knuckle 58. Inasmuch as the surfaces bearing against the plastic face 56 are not polished as precisely or controlled as accurately as the surface of the washer 35 shown in FIGURE 2, and the knuckle end surface may be contaminated by plated finishes or other coatings, the hinge shown in FIGURES 1 to 3 of the drawings has a longer operating life and is preferred. Nevertheless, the hinge 48 has an operating life comparable or superior to the prior ball bearing types of hinges and far superior to the bushed type of heavy duty hinges provided heretofore as well as providing substantial advantages from the standpoint of ease of manufacture, satisfactory plating and the like as set forth above.

A preferred form of the invention shown in FIGURES 6 to 11 provides a hinge with closer spacing between knuckles and a narrower barrel, and incorporates other advantageous features. To this end, a three knuckle hinge includes a pair of hinge leaves 60 and 61, the hinge leaf 60 carrying a pair of spaced apart knuckles 62 and 63 closely adjacent the ends of a knuckle 64 carried by the leaf 61.

As shown in FIGURES 6, 7 and 10, plastic bushings 65 and 66, typically formed of a low friction plastic such, for example, as "Delrin" at least partially impregnated with "Teflon," are secured in the ends of the knuckle 64 by a suitable adhesive 67, explained in detail in connection with the bushings 15 and 16 shown in FIGURE 1. To insure secure bonding of the bushings to the knuckles and to prevent their rotation relative to the knuckles, longitudinal grooves 68 are formed in the cylindrical surfaces of the bushings 65 and 66 to receive adhesive and help to distribute it along the bushings and bore 69 of the knuckle.

To locate the bushing 65 at a proper depth in the knuckle 64, in which it is bedded, an annular shoulder 70 on the bushing engages a ledge 71 in the knuckle. A step in the bushing 65, formed by an annular surface 74 and a shoulder 75 which are respectively juxtaposed upon assembly with a counterbore 76 and a ledge 77, provides a larger thrust bearing area on a face 78 of the bushing 65. A fin 79 at the upper end of the bushing 65 cooperates with a counterbore 73 to prevent an undesired flow of cement to the outer surface of the knuckle. In particular, referring to FIGURE 8, prior to assembly adhesive is suitably applied to the knuckle-bushing cooperating surfaces. The bushing 65 is then inserted into the knuckle 64, as shown in FIGURE 10, and when adhesive flows towards the outer end of the knuckle, its escape is prevented by the fin 79 which, upon engagement with the knuckle, is partially sheared off or eroded, and also becomes flattened to act as a retainer ring, as shown in FIGURES 7 and 10. Note that adhesive bonding used with the plastic bushing 65 permits assembly of the bushing and knuckle without reduction of the bushing's inner diameter. This is in contrast to force fitting which requires that an allowance be made for some decrease in the inner diameter of the bushing, and often this would result in too loose a fit on the hinge pin. Note also that a slight clearance between the bushing 65 and the knuckle bore 69 enables a correction of the bearing axis in the event, for example, of an off-center deviation of the knuckle bore.

Respectively mounted in the knuckles 62 and 63 are a pair of metal bushings 80 and 80a, preferably formed of a work hardenable stainless steel. The bushing 80, as shown in FIGURE 7, includes a sleeve portion 81, a knurled ring 82 spaced longitudinally from the sleeve 81, and a flange 83 at its end. A chamfer 84 is formed peripherally around the lower edge of the flange 83.

To secure the bushing 80 in the knuckle 62, a suitable adhesive 67a, such as of the type discussed in connection with the bushing 15 in FIGURE 2, is coated on the bushing and bore 85 of the knuckle. The bushing 80 is then pressed into the knuckle 62, and the knurled ring 82, which is formed with a diameter slightly larger than the bore 85, holds the parts together until the adhesive hardens. Adhesive forced into the knurled ring also helps to prevent rotation of the bushing 80 relative to the knuckle.

An annular shoulder 86, formed by a counterbore 87, cooperates with the underside of the flange 83 generally to locate the bushing in the knuckle. A flange 88 projecting from the flange 83 cooperates with the counterbore 87 to prevent the escape of adhesive from the knuckle. An alternative arrangement to prevent the escape of adhesive, shown in FIGURE 11, comprises a flange 89, projecting inwardly from the counterbore 87, to cooperate with the flange 83.

Due to the clearance provided between the bushing 80 and the bore 85, it is possible to correct the angularity of the bushing before the adhesive hardens if, for example, the knuckle bore is slightly off-axis relative to the working axis of the hinge pin. Moreover, the adhesive in the void between the flange 83 and the shoulder 86 permits axial adjustment of the bushing 80 for a precise fit with the knuckle 62 prior to hardening of the adhesive.

An end face 90 on the bushing 80 is precision polished to a surface smoothness on the order of from 4 to 12 microinches to minimize friction with the bearing face 78 of plastic bushing 65. The surface may be finished prior to inserting the bushing 80 into the knuckle 62.

During the assembly of hinges incorporating plastic parts there has been a tendency for any sharp metal edges of the knuckles to gouge and cut the plastic. To overcome this problem, the preferred hinge shown in FIGURES 6 to 11 is formed in a novel manner. The bushings 65 and 66 when inserted into the ends of the knuckle 64 are sized to protrude a short distance beyond the ends of the knuckle, as shown in FIGURE 10. After the bushings 65 and 66 have been securely locked in position by hardening of the adhesive 67, a qualifying mill cut is simultaneously made along the dashed lines 91 and 92 to provide accurately leveled surfaces on the outer ends of the knuckle 64 with a precisely controlled dimension between such ends. With this construction, hinge knuckles are readily interchangeable, and the resulting hinges fit closely together and are readily assembled as described below.

A preferred form of hinge pin and retainer is used with the hinges shown in FIGURES 6 to 11. As best illustrated in FIGURE 9, a hinge pin 93, extending through the metal bushings 80 and 80a and the plastic bushings 65 and 66, includes a diamond knurled portion 94 at its upper end. A cap 95, driven onto the pin 93, is retained and initially held in position by the knurled portion 94. The cap is then subjected to a swaging operation to control its outer dimensions, and this has the effect of locking it to the pin 93.

To hold the pin 93 longitudinally in position and prevent its rotation relative to the knuckles 62 and 63, the cap 95 includes a sleeve 96, reduced portions 97 and an enlarged annular ring 98. When the pin 93 is driven into the hinge, the annular ring 98 is forced into a counterbore 100 until an outer cap flange 101 seats on the upper surface 102 of the knuckle.

To provide a pleasing appearance and prevent entry of dirt and moisture, an end cap 104 is driven into the lower knuckle 63, and ridges 105 on the cap are forced into a counterbore 106 to secure it in its proper location. To drive the pin 93 out of the hinge, a nail or other suitable object can be inserted through a bore 107 in the cap 104.

If desired, the cap 95 may be roll threaded during swaging of the cap onto the pin 93, and cooperating threads may also be provided in the ends of the knuckles 62 and 63. With this arrangement, as well as with the driven pin, the pin 93 may be inserted at either end of the hinge and securely locked in position thus enabling these hinges to be used as reversible units.

In assembling the hinge shown in FIGURES 6 to 11, the projecting chamfered edges 84 of the steel bushings 80 and 80a initially engage and are guided by the outer surfaces of the knuckle 64, leveled during the qualifying mill cut, to hold the sharp edges of the knuckles 62 and 63 away from and thereby prevent damage to the radially inward plastic bearing surfaces 78. In other words, the outer surfaces of the knuckle 64 tend to guard the bearing faces 78 of the plastic bushings 65 and 66. Subsequent engagement of the bearing faces 78 by the chamfered steel bushings 80 and 80a will not result in injury to the bearing surfaces. Moreover, this construction, which enables close spacing between the hinge knuckles, limits dirt and moisture entry to the bearings and provides a pleasing appearance.

Hinges of the type shown in FIGURES 6 to 11 have an operating life comparable to that discussed in connection with the hinge shown in FIGURES 1 to 3.

As indicated above, it is preferred that the steel bushings, or at least the washers, which bear against the plastic bushings, should be made of stainless steel for the reason that stainless steel can be highly polished and smooth surfaces maintained thereon to reduce greatly the friction between the plastic bushings and the stainless steel bushings or washers. However, when corrosion is not a problem and reduced operating life is acceptable, the washers 35 and the bushings can be formed of less corrosion-resistant metals capable of receiving a good polish or a plating of a polished metal, such as chromium, on the bearing surfaces thereof.

Other variations and modifications can be made in the size, proportion, shape of the hinge leaves, in the number of knuckles on the hinges, and accordingly the form of the invention described herein should be considered as illustrative and not as limiting the scope of the invention as defined in the following claims.

I claim:

1. A hinge comprising a pair of leaves, at least one knuckle on each leaf, an anti-friction plastic bushing embedded in one of said knuckles having an end face adjacent one end of said one knuckle, a metallic bushing embedded in the other knuckle on the other leaf, said metallic bushing having a polished end face adjacent one end of said other knuckle, and a hinge pin extending through said bushings and connecting said knuckles in end to end relation with said end faces of said plastic and metallic bushings in sliding engagement.

2. The hinge set forth in claim 1, in which said plastic bushing has grooves in its outer surface, and comprising an adhesive in said grooves and between said plastic bushing and said knuckle bonding them together.

3. The hinge set forth in claim 1, in which said plastic bushing comprises an acetal resin containing a fluorocarbon as a lubricant.

4. The hinge set forth in claim 1, comprising a shoulder in said other knuckle, an end flange on said metallic bushing engaging said shoulder, and staked tongues on said other knuckle engaging said metallic bushing to retain said bushing in said knuckle, said flange having said polished end face thereon.

5. The hinge set forth in claim 4, in which said flange comprises a stainless steel washer secured to said metallic bushing and having a polished surface forming said end face of said metallic bushing.

6. The hinge set forth in claim 1, comprising a shoulder in said knuckle on said one leaf and a flange on said plastic bushing having said end face thereon, said flange engaging said shoulder and positioning said plastic bushing with said end face in a plane substantially perpendicular to the axis of said hinge pin.

7. The hinge set forth in claim 1, comprising a flange on said metallic bushing, a collar on said metallic bushing concentric with said flange, a stainless steel washer having said polished end face thereon fixed to said collar, a shoulder in said knuckle on said other leaf engaging said flange and positioning said end face in a plane substantially perpendicular to the axis of said hinge pin, and means securing said flange to said knuckle to retain said metallic bushing against movement relative to said knuckle.

8. The hinge set forth in claim 7, comprising another shoulder in said knuckle on said one leaf and a flange on said plastic bushing having said end face thereon, said flange on said plastic bushing engaging said another shoulder and positioning said end face in a plane substantially perpendicular to the axis of said hinge pin.

9. The hinge set forth in claim 7, comprising another shoulder in said knuckle on said one leaf and a flange on said plastic bushing having said end face thereon, said flange on said plastic bushing engaging said another shoulder and positioning said end face in a plane substantially perpendicular to the axis of said hinge pin, and an adhesive securing said plastic bushing in said knuckle of said one leaf.

10. The hinge set forth in claim 7, comprising another shoulder in said knuckle on said one leaf and a flange on said plastic bushing having said end face thereon, said flange on said plastic bushing engaging said another shoulder and positioning said end face in a plane substantially perpendicular to the axis of said hinge pin, an adhesive securing said plastic bushing in said knuckle of said one leaf, and grooves in the exterior of said plastic bushing for receiving said adhesive and directing excess adhesive into the interior of said knuckle.

11. A hinge comprising a pair of leaves, at least one knuckle on each leaf, an anti-friction plastic bushing embedded in one of said knuckles, an end flange on said plastic bushing having an end face adjacent one end of said one knuckle, a shoulder in said one knuckle supporting said plastic end flange, an adhesive between portions of said plastic bushing and said one knuckle bonding them together, a metallic bushing embedded in the other knuckle on the other leaf, an end flange on said metallic bushing having a polished end face adjacent one end of said other knuckle, a shoulder in said other knuckle supporting said metallic end flange, means securing said metallic bushing in said other knuckle, and a hinge pin extending through said bushings and connecting said knuckles in end to end relation with said end faces of said plastic and metallic flanges in sliding engagement.

12. The hinge set forth in claim 11, in which said plastic bushing comprises an acetal resin containing a fluorocarbon as a lubricant.

13. The hinge as set forth in claim 11, in which an annular ridge is formed on said plastic flange, and a counterbore in said one knuckle to engage said ridge to retain adhesive within the knuckle.

14. The hinge as set forth in claim 11, in which said securing means for said metallic bushing comprises an adhesive.

15. The hinge as set forth in claim 14, in which said securing means for said metallic bushing includes a knurled ring on its outer surface to engage said other knuckle and hold said metallic bushing in position while said adhesive hardens.

16. The hinge as set forth in claim 14, in which an adhesive retaining flange is formed on one of said other knuckle and metallic flange for engagement with the other of said other knuckle and metallic flange.

17. The hinge as set forth in claim 11, in which said hinge pin includes a cap, and means securing the cap to said other knuckle to prevent relative rotation between the hinge pin and the other knuckle.

18. A hinge comprising a pair of leaves, at least one central knuckle on one leaf, at least two outer knuckles on the other leaf, an anti-friction plastic bushing embedded in each end of said central knuckle, end flanges on said plastic bushings having end faces coextensive with the end surfaces of said central knuckle, shoulders in said central knuckle supporting said plastic end flanges, an adhesive between portions of said plastic bushings and said central knuckle bonding them together, a metallic bushing embedded in each outer knuckle, end flanges on said metallic bushings having polished end faces adjacent the ends of said central knuckle, said metallic end flanges extending beyond the end surfaces of said outer knuckles, shoulders in said outer knuckles supporting said metallic end flanges, means securing said metallic bushings in said outer knuckles, and a hinge pin extending through said bushings and connecting said knuckles in end to end relation with said end faces of said plastic and metallic flanges in sliding engagement.

19. The hinge set forth in claim 18, in which said plastic bushings comprise an acetal resin containing a fluorocarbon as a lubricant.

20. The hinge set forth in claim 18, in which the end faces of said plastic bushings and the end surfaces of said central knuckle are accurately leveled and spaced a precise dimension apart by a simultaneous mill cut through both ends of said central knuckle.

21. The hinge set forth in claim 18, in which said metallic end flanges are chamfered to said polished metallic end faces.

References Cited

UNITED STATES PATENTS

| | | | |
|---|---|---|---|
| 3,137,887 | 6/1963 | Mannino et al. | 16—2 |
| 3,218,098 | 11/1965 | Rowlett | 308—70 |
| 3,240,095 | 3/1966 | Steinway | 308—238 |
| 3,216,054 | 11/1966 | Cain | 16—135 |
| 3,007,193 | 11/1961 | Hughes et al. | 16—136 |
| 3,135,013 | 6/1964 | Parsons | 16—169 |

BOBBY R. GAY, Primary Examiner

DORIS L. TROUTMAN, Assistant Examiner

U.S. Cl. X.R.

308—237